(No Model.)
A. FELBER.
STOP MOTION FOR BUTTON HOLE SEWING MACHINES.
No. 267,510. Patented Nov. 14, 1882.
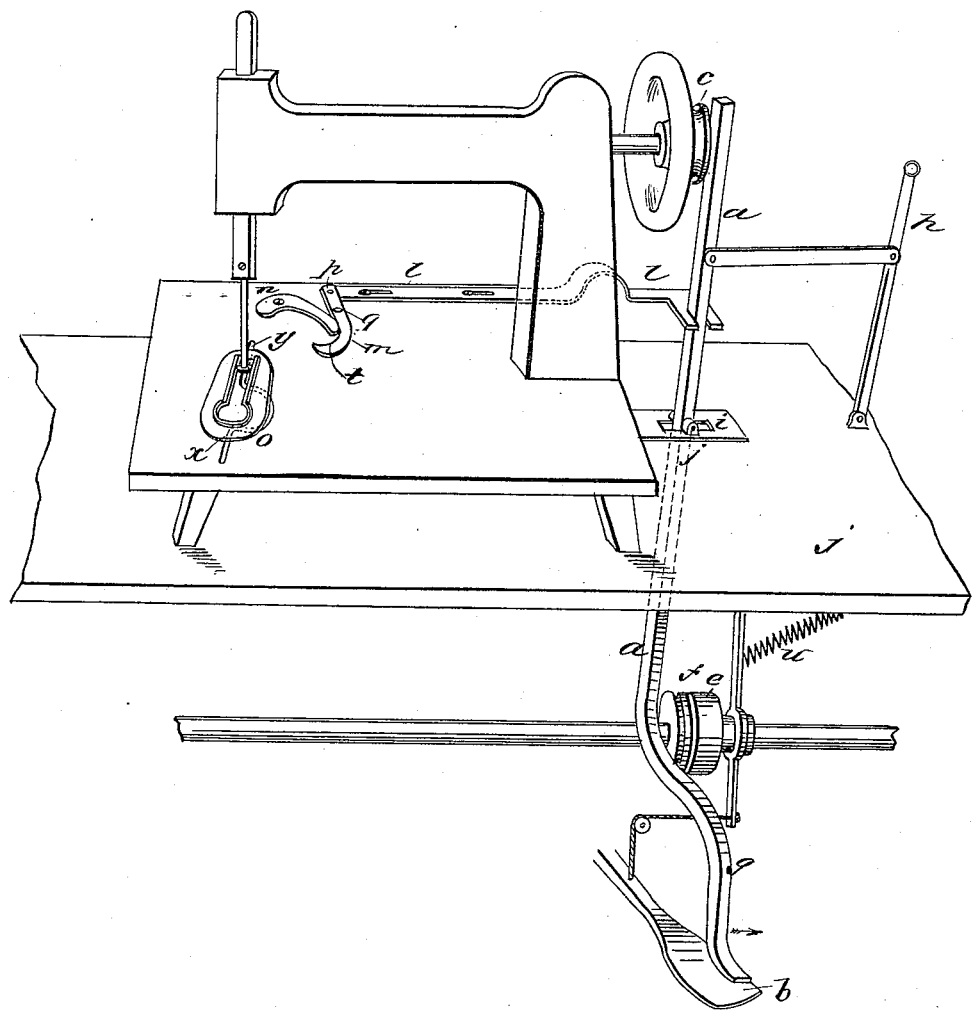
WITNESSES:
INVENTOR:
BY
ATTORNEYS.

United States Patent Office.

ARTHUR FELBER, OF LOUISVILLE, KENTUCKY.

STOP-MOTION FOR BUTTON-HOLE SEWING-MACHINES.

SPECIFICATION forming part of Letters Patent No. 267,510, dated November 14, 1882.

Application filed July 6, 1882. (No model.)

*To all whom it may concern:*

Be it known that I, ARTHUR FELBER, of Louisville, in the county of Jefferson and State of Kentucky, have invented a new and Improved Stop-Motion for Button-Hole Sewing-Machines, of which the following is a full, clear, and exact description.

My invention consists of an arrangement of automatic stop mechanism for button-hole sewing-machines, whereby after setting a machine in motion the operator may turn his attention to another machine for setting that in motion, leaving the first to stop itself when the button-hole is completed, to be attended to after the second machine has been started and while it is in motion, thus enabling one operator to run two machines in manufacturing places where power is employed for driving them, all as hereinafter fully described, and pointed out in the claims.

Reference is to be had to the accompanying drawing, forming part of this specification, and which is a perspective view of a button-hole sewing-machine with my improved stop-motion apparatus applied to it.

I arrange a lever, $a$, in such relation to the foot-treadle $b$ and the pulley $c$ of the driving-shaft of the sewing-machine that when the treadle has been pressed down by the attendant to engage the clutch $e$ with the pulley $f$ for setting the machine in motion the operator may swing the lower end, $g$, of said lever $a$ over the top of the treadle by the lever $h$, at the same time swinging the upper end of said lever $a$ away from the side of pulley $c$, thus setting the treadle to keep the machine in motion, and at the same time relieving the pulley $c$ from any resistance by pressure of the lever $a$ on its side. The lever $a$ passes up through a slotted plate, $i$, in the bench $j$, where it is pivoted, and may have a spring so connected as to press the lever toward the pulley $c$. To trip the lever from treadle $b$ for allowing spring $u$ to disconnect the driving-clutch $e$ from loose driving-pulley $f$, and at the same time causing the upper end of said lever to bear against the side of pulley $c$ for a brake to stop the machine, I have arranged the slide $l$, trip-lever $m$, and dog $n$, as shown, in respect to it and the button-hole cam $o$ of the sewing-machine, the slide $l$ being pivoted at $p$ to trip-lever $m$, which is pivoted to the sewing-machine work-plate at $q$, and the dog $n$ being so arranged with respect to cam $o$ that when the hole is stitched around the part $x$ of the cam will shift the dog so as to swing its long arm along the curve $t$ of lever $m$, to cause it to draw slide $l$ and swing the lower end of lever $a$ off from treadle $b$ to the right hand, and the upper end against pulley $c$, allowing the spring $u$ to swing the treadle and disconnect the clutch to stop the machine. The part $y$ of the cam $o$ does not reach the dog $n$ as the cam swings around. The apparatus may be so adjusted as to stop the machine with the needle up, and thus save loss of time in shifting the machine after it has stopped.

The contrivance is designed for use in connection with machines run by power, and with which the treadle is employed to connect and disconnect the clutch.

It will be seen that by the aid of this contrivance the operator will not be obliged to confine his attention to one machine, as he is now required to do, for watching it to enable him to stop it at the right time, but may attend another one sufficiently to adjust and set it in motion while the first one is working around to the stopping-point.

Having thus fully described my invention, I claim as new and desire to secure by Letters Patent—

1. In a button-hole sewing-machine, the combination, with the driving-pulley $c$ and clutch-treadle $b$, of the pivoted lever $a$ and tripping mechanism adapted to be actuated by the button-hole cam, substantially as shown and described, whereby the lower end of the said lever is disengaged from the treadle and its upper end thrown in contact with the drive-pulley, as and for the purpose set forth.

2. The combination, with cam $o$, driving-pulley $c$, and clutch-actuating treadle $b$, of lever $a$, slide $l$, lever $m$, and dog $n$, substantially as described.

ARTHUR FELBER.

Witnesses:
WM. H. EVANS,
RICHD. H. TAYLOR.